United States Patent [19]

Sjöberg

[11] Patent Number: 4,941,689
[45] Date of Patent: Jul. 17, 1990

[54] COUPLING DEVICE FOR VACUUM CLEANER

[75] Inventor: Rolf G. Sjöberg, Kungsängen, Sweden

[73] Assignee: Aktiebolaget Electrolux, Stockholm, Sweden

[21] Appl. No.: 275,590

[22] Filed: Nov. 23, 1988

[30] Foreign Application Priority Data

Feb. 9, 1988 [SE] Sweden .................. 8800417

[51] Int. Cl.⁵ .................. A47L 9/24; F16L 39/02
[52] U.S. Cl. .................. 285/7; 285/319; 285/320; 285/921; 285/281; 285/174
[58] Field of Search .................. 285/7, 319, 320, 921, 285/281, 174

[56] References Cited

U.S. PATENT DOCUMENTS

| | | | |
|---|---|---|---|
| 115,917 | 6/1871 | Wharton | 285/921 |
| 2,523,770 | 9/1950 | Marette | 285/7 |
| 2,667,371 | 1/1954 | Holte | 285/7 |
| 2,755,106 | 7/1956 | Brennan et al. | 285/7 |
| 2,839,316 | 6/1958 | Kasper | 285/281 |
| 3,375,541 | 4/1968 | Fromknecht | 285/7 |
| 4,211,438 | 7/1980 | Asberg | 285/7 |

FOREIGN PATENT DOCUMENTS 641315 8/1950 United Kingdom .................. 285/921

Primary Examiner—Randolph A. Reese
Assistant Examiner—Carol I. Bordas
Attorney, Agent, or Firm—Pearne, Gordon, McCoy & Granger

[57] ABSTRACT

A coupling device for releasably connecting a suction hose (15) to a vacuum cleaner housing (10) includes a tube connection piece (13) attached to the suction base and adapted to be inserted into a cylindrical socket (11) in the vacuum cleaner housing. The tube connection piece (13) is rotatably attached to a coupling sleeve (16) which carries a latch (17) which is releasably connected to the vacuum cleaner housing (10) in a non-rotatable position.

1 Claim, 1 Drawing Sheet

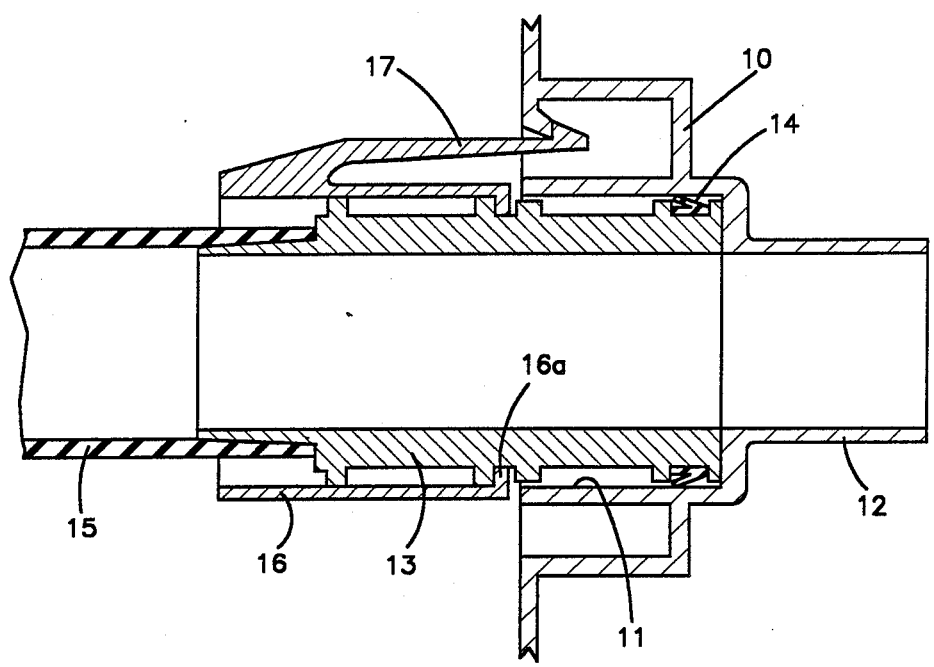

COUPLING DEVICE FOR VACUUM CLEANER

The present invention relates to a coupling device for releasably connecting a suction hose to the inlet of a vacuum cleaner housing, said inlet having a cylindrical socket adapted to receive a tube connection piece attached to the suction hose.

The object of the invention is to provide a coupling device which is easy to handle, has a good sealing capability and is resistant to mechanical damage.

SUMMARY OF THE INVENTION

In accordance with the present invention a coupling sleeve by means of a latch means is adapted to be releasably connected to the vacuum cleaner housing in a non-rotatable position. A tube connection piece is rotatably connected to the coupling sleeve and has a portion provided with a sealing ring, said portion extending sealingly into a socket in the connected position.

BRIEF DESCRIPTION OF THE DRAWING

The invention will be described in more detail below with reference to the accompanying drawing which illustrates a longitudinal section of the coupling device according to the invention.

DESCRIPTION OF THE PREFERRED EMBODIMENT

In the drawing, a portion of a vacuum cleaner housing 10 is shown which has a cylindrical socket 11 and a tube piece 12 adapted to be connected to a filter bag (not shown). A tube connection piece 13 is partly inserted into the socket 11. The end of the tube connection piece 13 inserted into the socket 11 is provided with a sealing ring 14, and the opposite end is fixed to a suction hose 15, for example by bonding.

The portion of the tube connection piece 13 adjacent to the suction hose is surrounded by a coupling sleeve 16 provided with a resilient latch 17 which engages a corresponding step in the housing 10. The coupling sleeve is thereby connected to the housing 10 in a non-rotatable manner. The coupling sleeve 16 has at its inner end an inward flange 16a which engages a corresponding groove in the tube connection piece 13. The tube connection piece is thereby held in the shown position but is rotatable together with the hose 15 in relation to the coupling sleeve 16 and also in relation to the housing 10.

Due to the fact that the sealing ring 14 seals directly between the tube connection piece 13 and the vacuum cleaner housing 10 the inlet passage of the vacuum cleaner is sealed effectively and no additional sealings are necessary. When the hose 15 is to be disconnected from the vacuum cleaner housing, the latch 17 is released and the tube connection piece 13 can subsequently be withdrawn from the socket 11.

I claim:

1. A coupling device for releasably connecting a suction hose (15) to the inlet of a vacuum cleaner housing (10), said inlet having a cylindrical socket (11) adapted to receive a tube connection piece (13) attached at one end to the suction hose (15), characterized by a coupling sleeve (16) which by means of a latch means (17) is adapted to be releasably connected to the vacuum cleaner housing in a non-rotatable position, said tube connection piece (13) being rotatably connected within the coupling sleeve (16) and having a portion at the other end provided with a sealing ring (14), said portion extending sealingly into said socket (11) in the connected position.

* * * * *